US012591087B2

(12) United States Patent
Li et al.

(10) Patent No.: US 12,591,087 B2
(45) Date of Patent: Mar. 31, 2026

(54) DISPLAY MODULE

(71) Applicants: Beijing BOE Display Technology Co., Ltd., Beijing (CN); BOE Technology Group Co., Ltd., Beijing (CN)

(72) Inventors: Huiyan Li, Beijing (CN); Yu Zhang, Beijing (CN); Fuxue Liang, Beijing (CN); Miao Liu, Beijing (CN); Shixin Geng, Beijing (CN); Xuefei Qin, Beijing (CN); Zhuolong Li, Beijing (CN); Lulu Wang, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 491 days.

(21) Appl. No.: 18/027,812

(22) PCT Filed: Mar. 31, 2022

(86) PCT No.: PCT/CN2022/084387
§ 371 (c)(1),
(2) Date: Mar. 22, 2023

(87) PCT Pub. No.: WO2023/184331
PCT Pub. Date: Oct. 5, 2023

(65) Prior Publication Data
US 2024/0310568 A1    Sep. 19, 2024

(51) Int. Cl.
*F21V 8/00* (2006.01)
*F21S 8/00* (2006.01)
(52) U.S. Cl.
CPC .............. *G02B 6/0031* (2013.01); *F21S 8/00* (2013.01); *G02B 6/0055* (2013.01);
(Continued)

(58) Field of Classification Search
CPC .. G02B 6/0031; G02B 6/0055; G02B 6/0073; G02B 6/0083; G02B 6/0085; G02B 6/0088; G02B 6/0081
See application file for complete search history.

(56) References Cited

U.S. PATENT DOCUMENTS

2013/0223094 A1* 8/2013 Yang ................... G02B 6/0085
                                                            362/609
2014/0055703 A1 2/2014 Gu et al.
(Continued)

FOREIGN PATENT DOCUMENTS

CN        107728380 A     2/2018
CN        208107825 U    11/2018
(Continued)

*Primary Examiner* — Daniel Petkovsek
(74) *Attorney, Agent, or Firm* — WHDA, LLP

(57) ABSTRACT

A reflection sheet included in a display module is arranged between a back plate and a light guide plate, a plurality of light-emitting assemblies are arranged at a circumferential edge of the light guide plate; the light-emitting assembly includes a light-emitting member, a substrate and an optical adhesive layer, the light-emitting member is fixed on the substrate; the substrate is bonded to a first surface of the light guide plate via the optical adhesive layer; the light-emitting member is located at a circumferential edge of the light guide plate; a light-emitting surface of the light-emitting member is in contact with an edge of the light guide plate, the first surface is a surface opposite to a surface of the light guide plate for emitting light; and an end of the substrate is overlapped on a surface of an edge of the reflection sheet close to the light guide plate.

17 Claims, 11 Drawing Sheets

(52) U.S. Cl.
CPC .........  *G02B 6/0083* (2013.01); *G02B 6/0085*
(2013.01); *G02B 6/0088* (2013.01); *G02B*
*6/0091* (2013.01); *G02B 6/0073* (2013.01)

(56) References Cited

U.S. PATENT DOCUMENTS

| | | | |
|---|---|---|---|
| 2016/0209580 A1 | 7/2016 | Hosoki | |
| 2018/0067252 A1* | 3/2018 | Edamitsu | .......... G02F 1/133603 |
| 2019/0154907 A1* | 5/2019 | Zhong | .................. G02B 6/0055 |
| 2020/0225398 A1* | 7/2020 | Zhang | ................. G02B 6/0016 |
| 2021/0364689 A1 | 11/2021 | Li | |

FOREIGN PATENT DOCUMENTS

| | | | | |
|---|---|---|---|---|
| CN | 208400420 U | 1/2019 | | |
| CN | 110910833 A | 3/2020 | | |
| CN | 210323690 U | 4/2020 | | |
| CN | 113126197 A | 7/2021 | | |
| TW | M618911 U | 11/2021 | | |
| WO | 2014/029120 A1 | 2/2014 | | |
| WO | WO-2021147848 A1 * | 7/2021 | .......... G02B 6/0083 |

* cited by examiner

DISPLAY MODULE

TECHNICAL FIELD

The present disclosure relates to the technical field of display, and in particular to a display module.

BACKGROUND

With the diversification of application scenes of display modules, the requirements for the appearance effect of the display modules in the terminal market are increasingly diversified. More and more special-shaped modules are applied in various business and special display fields. In addition to the traditional display modules with rectangular display surfaces, the display modules with circular, square, polygonal and other special-shaped display surfaces are gradually introduced into the market.

At present, according to the existing display module with a rectangular display surface, a light-emitting assembly is generally fixed on a back plate. The light enters through the bottom of the display module. An elastic heat-conducting member is provided at the top of the display module. The gap between the light-emitting assembly located at the bottom and a light guide plate is kept within a certain range by the gravity action of the elastic heat-conducting member, thereby ensuring the light entering efficiency of the light-emitting assembly to the light guide plate, and providing sufficient space for the thermal expansion and contraction of the elastic heat-conducting member.

However, in a display module with a special-shaped display surface, the way of entering light on one side cannot satisfy the overall picture taste of the module. The uniformity of the brightness and the picture of the display module cannot be balanced only by the dot distribution of the light guide plate, so that the display module has problems such as a dark edge, a dark angle or insufficient uniformity, which seriously affects the display effect of the display module.

SUMMARY

The embodiments of the present disclosure provide a display module to solve the problem of the related art that the display module has a dark edge, a dark angle or insufficient uniformity.

In order to solve the above technical problem, the present disclosure is achieved as follows.

In a first aspect, embodiments of the present disclosure provide a display module including a light guide plate, a reflection sheet, a back plate and a plurality of light-emitting assemblies:

the reflection sheet is arranged between the back plate and the light guide plate, and the plurality of light-emitting assemblies are arranged at a circumferential edge of the light guide plate;

each of the plurality of light-emitting assembly includes a light-emitting member, a substrate and an optical adhesive layer, the light-emitting member is fixed on the substrate, the substrate is bonded to a first surface of the light guide plate via the optical adhesive layer, the light-emitting member is located at a circumferential edge of the light guide plate, a light-emitting surface of the light-emitting member is in contact with an edge of the light guide plate, wherein the first surface is a surface opposite to a surface of the light guide plate for emitting light; and an end of the substrate is overlapped on a surface of an edge of the reflection sheet close to the light guide plate.

Optionally, the display module further includes an elastic heat-conducting member and a fixing adhesive layer:

a plurality of fixing grooves are provided at an edge position of a surface of the back plate close to the reflection sheet, and a notch of each of the plurality of fixing grooves faces towards the light guide plate; and each of the fixing grooves is fixed with one elastic heat-conducting member via the fixing adhesive layer, a gap is provided between a side of the elastic heat-conducting member close to the reflection sheet and the reflection sheet, a top of the elastic heat-conducting member is in contact with the substrate, and a bottom of the elastic heat-conducting member is in contact with a bottom of the fixing groove.

Optionally, a width of the gap between the side of the elastic heat-conductive member close to the reflection sheet and the reflection sheet is greater than or equal to 0.35 mm.

Optionally, an edge of the back plate is provided with a support arm; and the support arm extends in a direction away from the bottom of the fixing groove and protrudes from the notch of the fixing groove, and a side of the elastic heat-conducting member away from the reflection sheet is in contact with the support arm.

Optionally, a gap is provided between an end of the substrate away from the light guide plate and the support arm.

Optionally, a width of the gap between the end of the substrate away from the light guide plate and the support arm is greater than or equal to 0.5 mm and less than or equal to 1 mm.

Optionally, a groove wall on a side of the fixing groove close to the reflection sheet is an inclined surface, and an included angle between a plane where the inclined surface is located and a plane where the bottom of the fixing groove is located is an obtuse angle.

Optionally, the substrate and the reflection sheet are overlapped by an amount greater than or equal to 0.85 mm.

Optionally, a surface of the back plate close to the reflection sheet is provided with a plurality of punching grooves, a notch of each of the plurality of punching grooves faces towards the light guide plate, and a convex structure is formed on a surface of the back plate away from the reflection sheet.

Optionally, a distance between a position where a first incident light reaches the reflection sheet and an end of the optical adhesive layer close to the reflection sheet is greater than or equal to 0.5 mm, and the first incident light is a light having an angle of 45° between an incident light and a direction perpendicular to a plane in which the reflection sheet is located.

Optionally, the display module further includes an optical membrane:

the optical membrane is attached on a second surface of the light guide plate, wherein the second surface is an incident surface of the light guide plate; and a black edge printing area is arranged between the light guide plate and an edge of the optical membrane.

Optionally, a surface of the substrate in contact with the reflection surface is coated with a reflective oil film.

Optionally, a distance between an end of the optical adhesive layer away from the light-emitting member and the light-emitting surface of the light-emitting member is greater than or equal to 2 mm.

Optionally, a distance between an end of the substrate away from the light-emitting member and an end of the optical adhesive layer away from the light-emitting member is greater than or equal to 1.2 mm.

Optionally, a first limiting structure is arranged between two adjacent light-emitting assemblies.

Optionally, a second limiting structure is arranged between two adjacent elastic heat-conducting members.

Optionally, the display module further includes a first frame, a display screen, a second frame and a circuit board:

the display screen is fixed between the first frame and the second frame, the second frame is connected between the optical membrane and the first frame, and an edge of the back plate is clamped on the second frame; and the circuit board is fixed on a surface of the back plate away from the light guide plate.

BRIEF DESCRIPTION OF THE DRAWINGS

In order to more clearly explain the embodiments of the present disclosure or the technical solutions in the prior art, the following will briefly introduce the drawings needed in the embodiments or the description of the prior art. It is obvious that the drawings in the following description are some embodiments of the present disclosure. For those skilled in the art, other drawings can also be obtained from these drawings without creative work.

REFERENCE NUMERALS

1: light guide plate; 2: reflection sheet; 3: back plate; 4: light-emitting assembly; 5: elastic heat-conducting member; 6: fixing adhesive layer; 7: optical membrane; 8: first limiting structure; 9: second limiting structure; 10: first frame; 11: display screen; 12: second frame; 13: circuit board; 301: fixing groove; 302: support arm; 303: punching groove; 401: light-emitting member; 402: substrate; 403: optical adhesive layer; 701: black edge printing area.

DETAILED DESCRIPTION

The technical solution in the embodiments of the present disclosure will be described clearly and completely in combination with the drawings in the embodiments of the present disclosure. Obviously, the described embodiments are part of the embodiments of the present disclosure, not all of them. Based on the embodiments in the present disclosure, all other embodiments obtained by ordinary technicians in the art without creative work fall within the scope of protection of the present disclosure.

It should be understood that "one embodiment" or "an embodiment" mentioned throughout the specification means that specific features, structures or characteristics related to the embodiment are included in at least one embodiment of the present disclosure. Therefore, the words "in one embodiment" or "in an embodiment" appearing throughout the entire specification may not necessarily refer to the same embodiment. In addition, these specific features, structures or features can be combined in one or more embodiments in any suitable way.

Before describing the display modules provided by embodiments of the present disclosure, factors affecting the display modules need to be described as follows.

Figure 18:
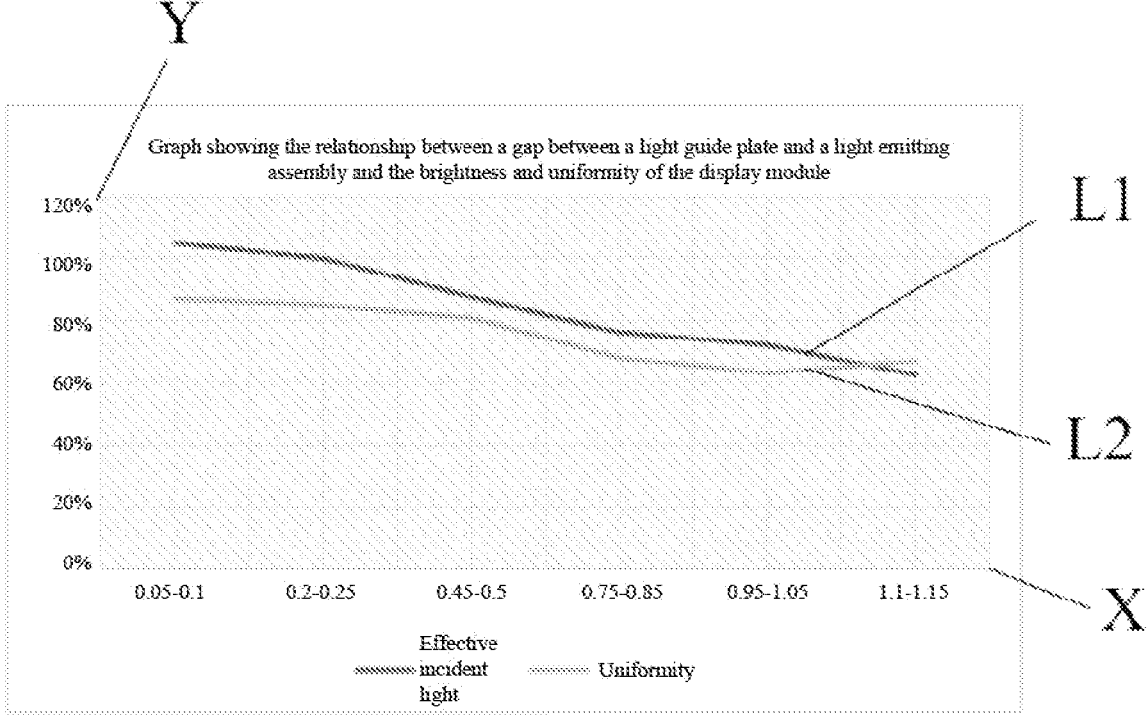
FIG. 18 is a graph showing the relationship between a gap between a light guide plate and a light-emitting assembly of the display module and the brightness and uniformity of the display module.

Table 1 is an analysis table of the influence of a gap value between a light-emitting assembly and a light guide plate of a display module having single-side incident light on the brightness and uniformity of the display module. It can be seen from Table 1 that as the gradient (gap gradient) of the gap between the light-emitting assembly and the light guide plate of the display module changes, that is, the process of the gap gradient gradually changing from T0 to T5. As the gap between the light-emitting assembly and the light guide plate of the display module increases, the greater the light loss of the display module (that is, the lower the brightness of the display module), the lower the uniformity of the display module, and the worse the image display effect of the display module. In summary, the smaller the gap between the light-emitting assembly and the light guide plate of the display module, the smaller the light loss of the display module, the greater the brightness of the display module, the higher the uniformity of the display module, and the better the picture display effect of the display module. The specific effect can be seen from the graph of FIG. 18. L1 represents the proportion of effective incident light. L2 represents the proportion of uniformity displayed by the display module. The abscissa X represents the gap between the light-emitting assembly and the light guide plate of the display module, and the ordinate Y represents the proportion.

Table 2 is a table for calculating the required gap of a light guide plate under a high-temperature environment of a display module having annular incident light. As can be obtained from Table 2, for the display module using annular incident light, the expansion and contraction size of the light guide plate depends on the basic size of the display module, the maximum temperature difference in the application environment, and the expansion and contraction coefficient of the light guide plate, etc. When the expansion of the light guide plate occurs at high temperature, the required gap of a single side of the light guide plate is 0.786 mm, and the final design value of the polygon characteristic of the integrated display module is 0.5 mm.

Table 3 is a table for calculating the required gap of the light guide plate of the display module having annular incident light under a low-temperature environment. The amount of increase in the gap on a single side of the light guide plate is 0.705 mm when the light guide plate shrinks at a low temperature, and the actual shrinkage of the light polygonal characteristics of the module. That is, when the value of the gap between the light-emitting assembly and the light guide plate is equal to 0.5 mm, the high-temperature expansion requirement of the display module can be satisfied. With reference to Table 1, when the gap gradient of the display module in this case is in the interval T2, the effective incident light rate of the light-emitting assembly is 87.59% and the uniformity is 81%. However, when the display module is in a low-temperature state, the gap between the light-emitting assembly and the light guide plate reaches 0.95 (0.5+0.45), then it can be obtained by combining Table 1 that, in this case, the effective incident light rate of the light-emitting assembly is 72.24% and the uniformity is 63%, showing that the display effect of the display module is seriously reduced.

Table 4 is a table for calculating the required gap of a reflection sheet under a high-temperature environment of a display module having annular incident light. As can be obtained from Table 4, when the display module is applied in the high-temperature environment, the manufacturing tolerance is superimposed, and the total required expansion space of the reflection sheet on a single side is 0.16 mm.

Table 5 is a table for calculating the difference in expansion of the reflection sheet and the light guide plate under a high-temperature environment for the display module having annular incident light. As can be obtained from Table 5, when the module is applied in a high-temperature environment, the light guide plate expands 0.49 mm more than the reflection sheet on a single side after superimposing manufacturing tolerances.

In summary, the factors influencing the display module include the value of the gap between the light-emitting assembly and the light guide plate of the display module, and the required gap between the light guide plate and the reflection sheet of the display module under high temperature and low temperature environments.

TABLE 1

| Gap gradient | T0 | T1 | T2 | T3 | T4 | T5 |
|---|---|---|---|---|---|---|
| Gap value (mm) | 0.05-0.1 | 0.2-0.25 | 0.45-0.5 | 0.75-0.85 | 0.95-1.05 | 1.1-1.15 |
| Effective incident light | 105% | 100% | 87.59% | 76.29% | 72.24% | 62.45% |
| Light loss | / | 0.00% | 12.41% | 23.71% | 27.76% | 37.55% |
| Center luminance | 15060 | 14300 | 12349 | 10714 | 10070 | 9036 |
| Average luminance | 14160 | 12999 | 11386 | 9917 | 9391 | 8118 |
| Uniformity | 87% | 85% | 81% | 68% | 63% | 67% | guide plate is expected to be about 0.45 mm according to the

TABLE 2

| Items | Light guide coefficient | Size | High temperature difference ($\Delta T = 60°$) | Expansion difference | Manufacturing tolerance | Manufacturing tolerance of peripheral overlapped parts | Requiring gap | Single-side requiring gap | Single-side gap after polygon conversion |
|---|---|---|---|---|---|---|---|---|---|
| Light guide plate | 0.0000512 | 635 | 60 | 1.951 | ±0.3 | ±0.3 | 1.572 | 0.786 | 0.5 |
| Back plate | 0.000023 | 635 | 60 | 0.876 | ±0.3 | ±0.3 | — | — | — |

TABLE 3

| Items | Light guide coefficient | Size | Low temperature difference (ΔT = 55°) | Expansion amount | Manufacturing tolerance | Manufacturing tolerance of peripheral overlapped parts | Gap increase amount | Single-side requiring gap | Polygon converted single-side gap |
|---|---|---|---|---|---|---|---|---|---|
| Light guide plate | 0.0000512 | 635 | 55 | 1.788 | ±0.3 | ±0.3 | 1.409 | 0.705 | 0.45 |
| Back plate | 0.000023 | 635 | 55 | 0.803 | ±0.3 | ±0.3 | — | — | — |

TABLE 4

| Items | Light guide coefficient | Size | High temperature difference (ΔT = 60°) | Expansion amount | Manufacturing tolerance | Manufacturing tolerance of peripheral overlapped parts | Requiring gap | Single-side requiring gap | Polygon converted single-side gap |
|---|---|---|---|---|---|---|---|---|---|
| Reflection sheet | 0.0000269 | 635 | 60 | 1.025 | ±0.2 | ±0.3 | 0.51 | 0.255 | 0.16 |
| Back plate | 0.000023 | 635 | 60 | 0.876 | ±0.2 | ±0.3 | — | — | — |

TABLE 5

| Items | Light guide coefficient | Size | High temperature difference (ΔT = 60°) | Expansion amount | Single-side expansion amount | Single-side expansion amount after polygon conversion | Manufacturing tolerance | Total difference in thermal expansion |
|---|---|---|---|---|---|---|---|---|
| Light guide plate | 0.0000512 | 635 | 60 | 1.951 | 0.976 | 0.621 | ±0.3 | 0.49 |
| Reflection sheet | 0.0000269 | 635 | 60 | 1.025 | 0.513 | 0.326 | ±0.2 | 0.49 |

Based on this, the embodiments of the present disclosure provide a display module to improve the display effect of the display module. Specifically, as shown in FIGS. 1, 2, 3 and 4, the display module includes a light guide plate 1, a reflection sheet 2, a back plate 3 and a plurality of light-emitting assemblies 4. The reflection sheet 2 is arranged between the back plate 3 and the light guide plate 1, and the plurality of light-emitting assemblies 4 are arranged at a circumferential edge of the light guide plate 1. The light-emitting assembly 4 includes a light-emitting member 401, a substrate 402 and an optical adhesive layer 403. The light-emitting member 401 is fixed on the substrate 402. The substrate 402 is bonded to a first surface of the light guide plate 1 via the optical adhesive layer 403. The light-emitting member 401 is located at a circumferential edge of the light guide plate 1. A light-emitting surface of the light-emitting member 401 is in contact with an edge of the light guide plate 1, wherein the first surface is a surface opposite to a surface of the light-emitting plate 1 for emitting light. An end of the substrate 402 is overlapped on a surface of the edge of the reflection sheet 2 close to the light guide plate 1.

The light guide plate 1 is an acrylic plate with an optical grade as a basic raw material, and then a light guide spot is printed on the bottom surface of the acrylic plate with an optical grade using a material with an extremely high reflectivity and no light absorption, so that the light guide plate 1 can absorb the light emitted from the light-emitting assembly 4.

The back plate 3 is a device for providing support for a display module. In the embodiments of the present disclosure, the back plate 3 may include any one of a stamping metal back plate 3, a glass back plate 3 and a composite material back plate 3. In order to ensure that the back plate 3 has a good heat dissipation property, the back plate 3 can be a composite material back plate 3. During installation, it is necessary to control the gap between a heating element in the display module and the back plate 3 so as to ensure heat transfer.

The reflection sheet 2 arranged between the back plate 3 and the light guide plate 1 is an optical device for reflecting incident light. The reflection surface of the reflection sheet 2 can be attached to the first surface of the light guide plate 1 by means of adhesion. The non-reflection surface of the reflection sheet 2 can be attached to the surface of the back plate 3 by means of adhesion. It should be noted that the reflection means of the reflection sheet 2 is a specular reflection, so that the light utilization rate can be improved. Further, the reflection sheet 2 may be a sheet-like reflection member formed of polyethylene terephthalate and titanium dioxide.

In some embodiments, in order to increase the strength of the reflection sheet 2, a plastic film, a high-strength base layer, etc. may be added to the reflection sheet 2. Among them, the high-strength base layer may be made of PET plastic or PC plastic, or aluminum foil. The embodiments of the present disclosure are not limited thereto. In addition, the thickness of the reflection sheet 2 may be greater than or equal to 100 μm and less than or equal to 250 μm. The reflectivity of the reflection sheet 2 at wavelengths of 450 nm. 550 nm and 650 nm is greater than or equal to 90%.

Figure 11:
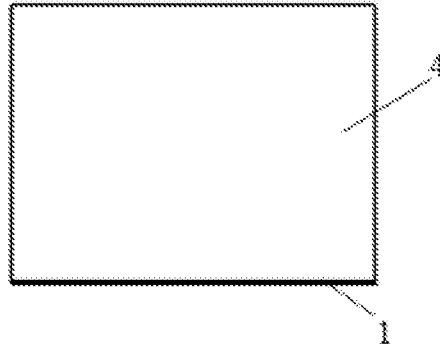
FIG. 11 shows a schematic diagram of incident light in a case where a display surface of a display module with a single-sided incident light in the related art is rectangular.
Figures 12, 13:
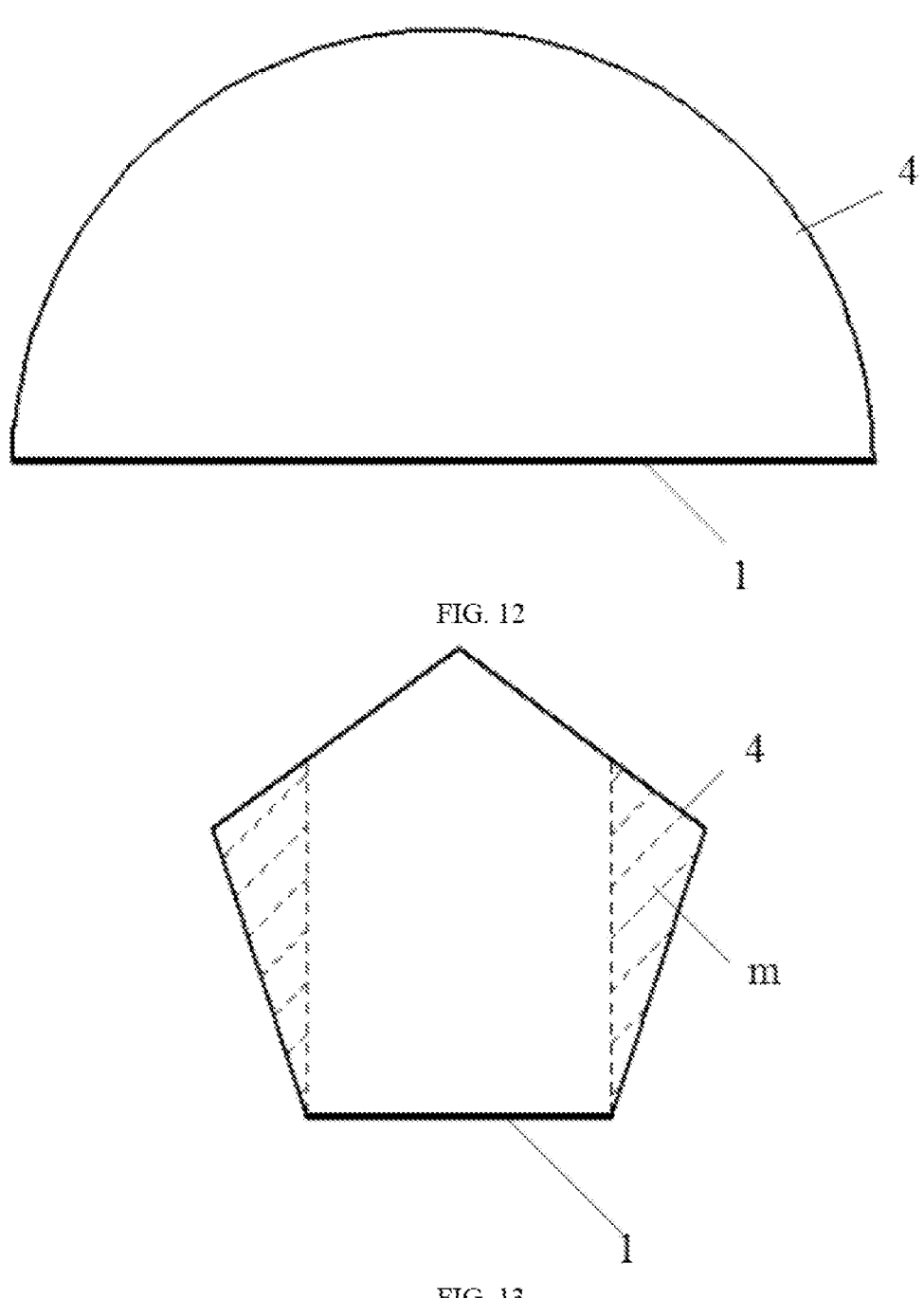
FIG. 12 shows a schematic diagram of incident light in a case where a display surface of a display module with a single-sided incident light in the related art has a semicircular shape.
FIG. 13 shows a schematic diagram of incident light in a case where a display surface of a display module with a single-sided incident light in the related art is a pentagon.
Figures 14, 15:
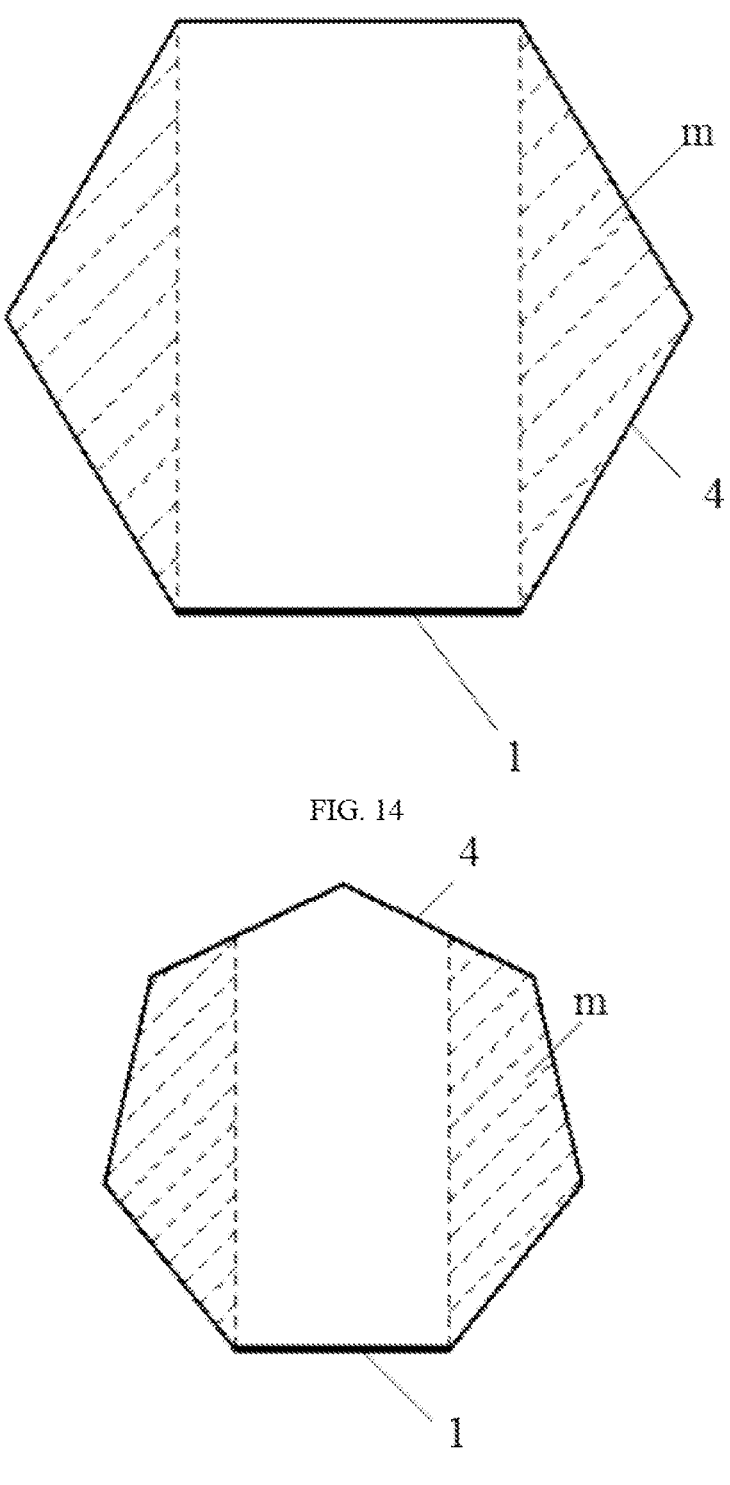
FIG. 14 shows a schematic diagram of incident light in a case where a display surface of a display module with a single-sided incident light in the related art is hexagonal.
FIG. 15 is a schematic diagram of incident light in a case where a display surface of a display module with a single-sided incident light in the related art is heptagonal.
Figure 16:
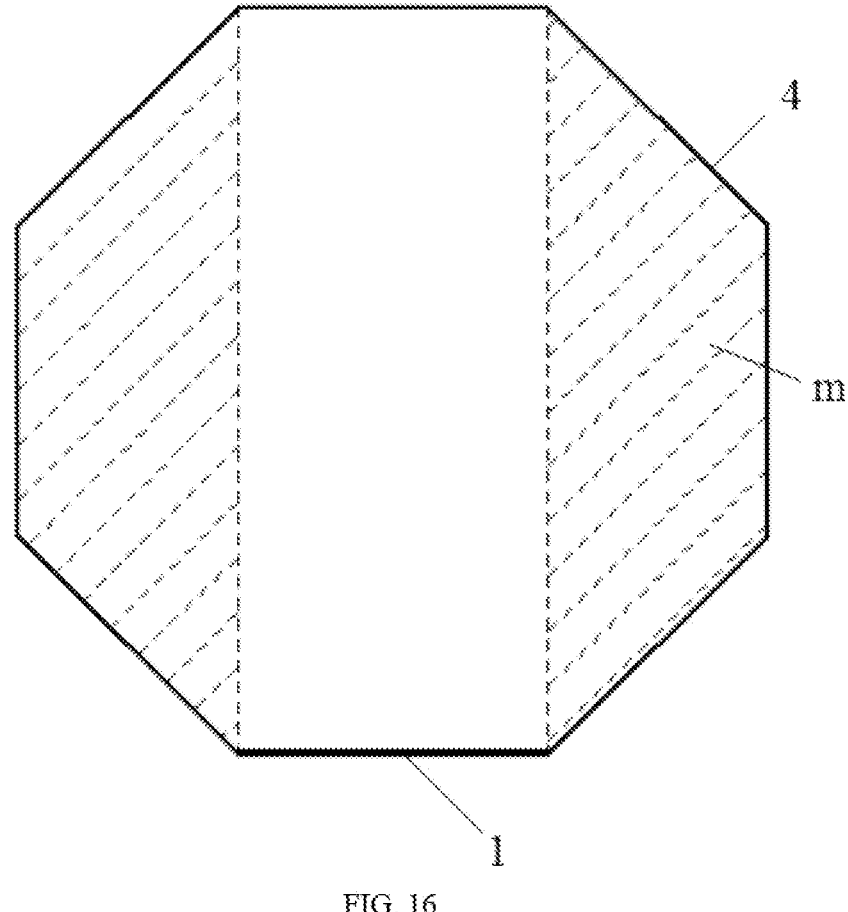
FIG. 16 is a schematic diagram of incident light in a case where a display surface of a display module with a single-sided incident light in the related art is octagonal.

It should also be noted that the display surfaces of the display modules of the embodiments of the present disclosure may be rectangular, circular, semi-circular, pentagonal, hexagonal, or other shapes. The embodiments of the present disclosure are not limited thereto. In the case where the light-emitting module 4 is arranged only at the bottom of the display module, as shown in FIGS. 11 and 12, in the case where the display surface of the display module is rectangular or semi-circular, the incident light may cover the entire display surface, so that the display screen of the display module has no dark angle. As shown in FIG. 13, FIG. 14, FIG. 15 and FIG. 16, when the display surface of the display module is pentagonal, hexagonal, heptagonal or octagonal, the incident light can only cover the area onto which the bottom edge of the display surface can be projected and a dark edge is caused on the two side areas of the display surface, with the dark edge as shown in an area m in FIG. 13, FIG. 14, FIG. 15 and FIG. 16, thereby affecting the display effect of the display module.

Figure 17:
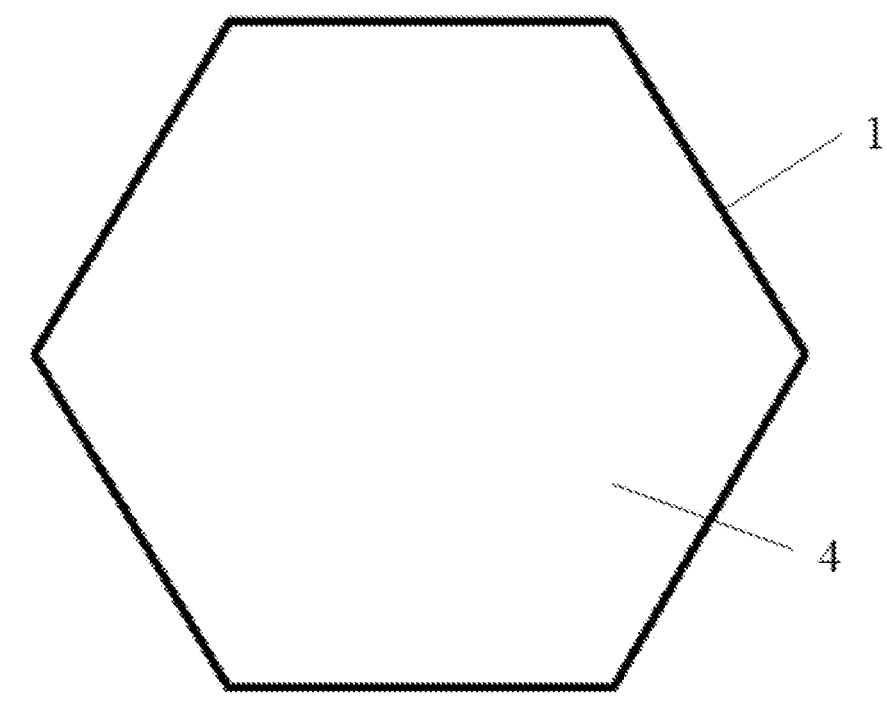
FIG. 17 shows a schematic diagram of a display module using an annular incident light according to an embodiment of the present disclosure.

Based on this, in order to ensure the display effect of the display module, in the embodiments of the present disclosure, as shown in FIG. 17, a plurality of light-emitting assemblies 4 are arranged at the circumferential edge of the light guide plate 1, that is, light-emitting assemblies 4 are arranged all around the light guide plate 1. Therefore, the display module can allow the incident light in an annular shape, so that the display module is not limited by the shape of the display surface and both can ensure the consistency of the display effect. Illustratively, if the display module provided by the embodiments of the present disclosure is a pentagonal display module, one light-emitting assembly 4 is provided on each of five sides of the display module. If the display module provided in the embodiments of the present disclosure is an octagonal display module, one light-emitting assembly 4 is arranged on each of eight sides of the display module. Alternatively, one light-emitting assembly 4 may be arranged on selected ones of the plurality of sides of the display module to ensure the consistency of the display effect.

Figure 4:
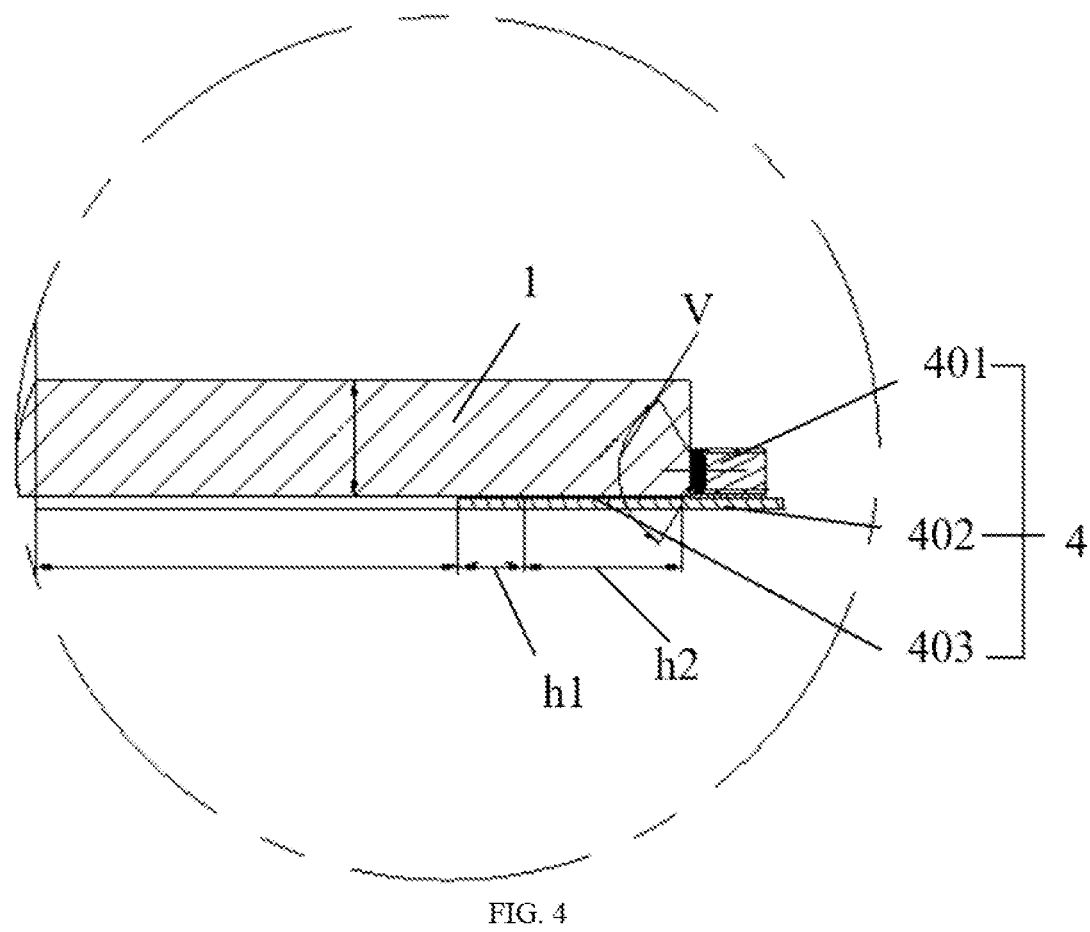
FIG. 4 shows a partially enlarged schematic diagram at A in FIG. 3 of a light-emitting assembly included in a display module according to an embodiment of the present disclosure.

Further, in the embodiment of the present disclosure, as shown in FIG. 4, the light-emitting assembly 4 includes a light-emitting member 401, a substrate 402 and an optical adhesive layer 403. The light-emitting member 401 may be fixed on the substrate 402 by means of a solder paste or a patch. The light-emitting member 401 may include a plurality of light-emitting diodes which are arranged and fixed on the substrate 402 according to a pre-set spacing. The substrate 402 is one of the circuit boards 13 for achieving circuit control of the light-emitting member 401. The substrate 402 is adhered to the first surface of the light guide plate 1 via the optical adhesive layer 403, so that the light-emitting assembly 4 is located at the circumferential edge of the light guide plate 1. Thus the light-emitting member 401 and the light guide plate 1 can form an integral body. The light-emitting member 401 can move together with the light guide plate 1 in the case of thermal expansion and contraction of the light guide plate 1. It should be noted that, since the thickness of the light guide plate 1 is relatively thin, the change in the size of the light guide plate 1 when thermal expansion and contraction occurs is mainly a change in the plane direction. Taking a circular display module as an example, the change in the size of the light guide plate 1 when thermal expansion and contraction occurs is mainly a change in the radial direction. Specifically, as the display module is heated, the radial size of the display module increases. As the display module temperature decreases, the radial size of the display module decreases. It should be noted that the first surface of the light guide plate 1 is a surface opposite to a surface of the light guide plate 1 for emitting light, that is, the first surface is a surface of the light guide plate 1 away from the display surface of the display module.

In order to enable the light emitted from the light-emitting member 401 to directly illuminate on the light guide plate 1, such that the light-emitting surface of the light-emitting member 401 is in contact with the edge of the light guide plate 1, there is no gap between the light-emitting surface of the light-emitting member 401 and the light guide plate 1, so that the light of the light-emitting member 401 can be completely absorbed by the light guide plate 1. The light-emitting surface of the light-emitting member 401 may be a tapered arc surface, so that the light exit angle of the light-emitting member 401 may reach 120°, so that it may be ensured that the light emitted by the light-emitting member 401 is absorbed by the light guide plate 1. Here, the light emission angle of the light-emitting member 401 is an angle shown by V in FIG. 4.

In addition, the end of the substrate 402 is overlapped on the surface of the edge of the reflection sheet 2 close to the light guide plate 1, so that it can be ensured that there is an overlap beam between the substrate 402 and the reflection sheet 2, thereby ensuring that the reflection sheet 2 is always located at the bottom of the substrate 402.

It can be seen from the above-mentioned embodiments that in the embodiments of the present disclosure, since a plurality of light-emitting assemblies 4 are arranged at the circumferential edge of the light guide plate 1, the light-emitting assemblies 4 are arranged all around the light guide plate 1, so that the display module may allow the incident light in an annular shape and thus the display module is not limited by the shape of the display surface, so as to ensure the consistency of the display effect. Furthermore, the light-emitting assembly 4 includes a light-emitting member 401, a substrate 402 and an optical adhesive layer 403. The light-emitting member 401 is fixed on the substrate 402. The substrate 402 is adhered to the first surface of the light guide plate 1 via the optical adhesive layer 403. The light-emitting member 401 is located at the peripheral edge of the light guide plate 1. The light-emitting surface of the light-emitting member 401 is in contact with the edge of the light guide plate 1. Based on the above-mentioned, the light-emitting member 401 and the light guide plate 1 may form an integral body. The light-emitting member 401 may move together with the light guide plate 1 in the case of thermal expansion and contraction of the light guide plate 1. In addition, there is no gap between the light-emitting surface of the light-emitting member 401 and the light guide plate 1. Therefore, the light of the light-emitting member 401 can all be absorbed by the light guide plate 1, thereby ensuring the effectiveness and uniformity of the brightness of the display module, so that the display effect of the display module is improved.

In addition, in order to further improve the display effect of the display module, it is necessary to provide sufficient space for the thermal expansion and contraction of the light guide plate 1 and the reflection sheet 2.

Figures 5, 6:
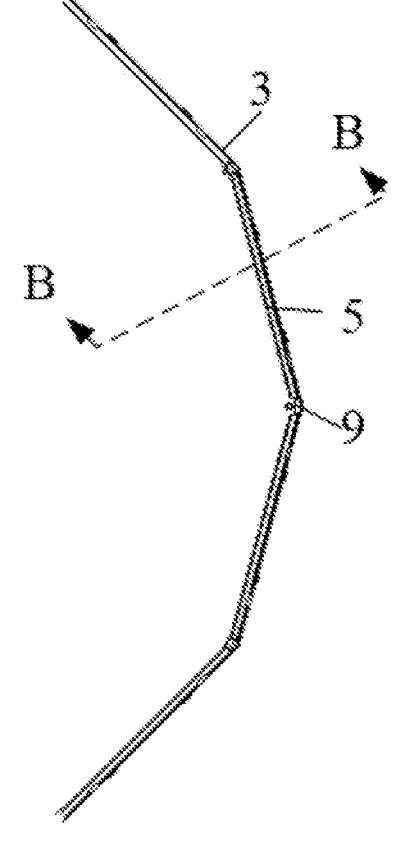
FIG. 5 shows a schematic diagram of an assembled structure of a back plate and an elastic heat-conducting member according to an embodiment of the present disclosure.
FIG. 6 shows a schematic cross-sectional diagram of a back plate and an elastic heat-conducting member in a direction B-B of FIG. 5 according to an embodiment of the present disclosure.
Figure 7:
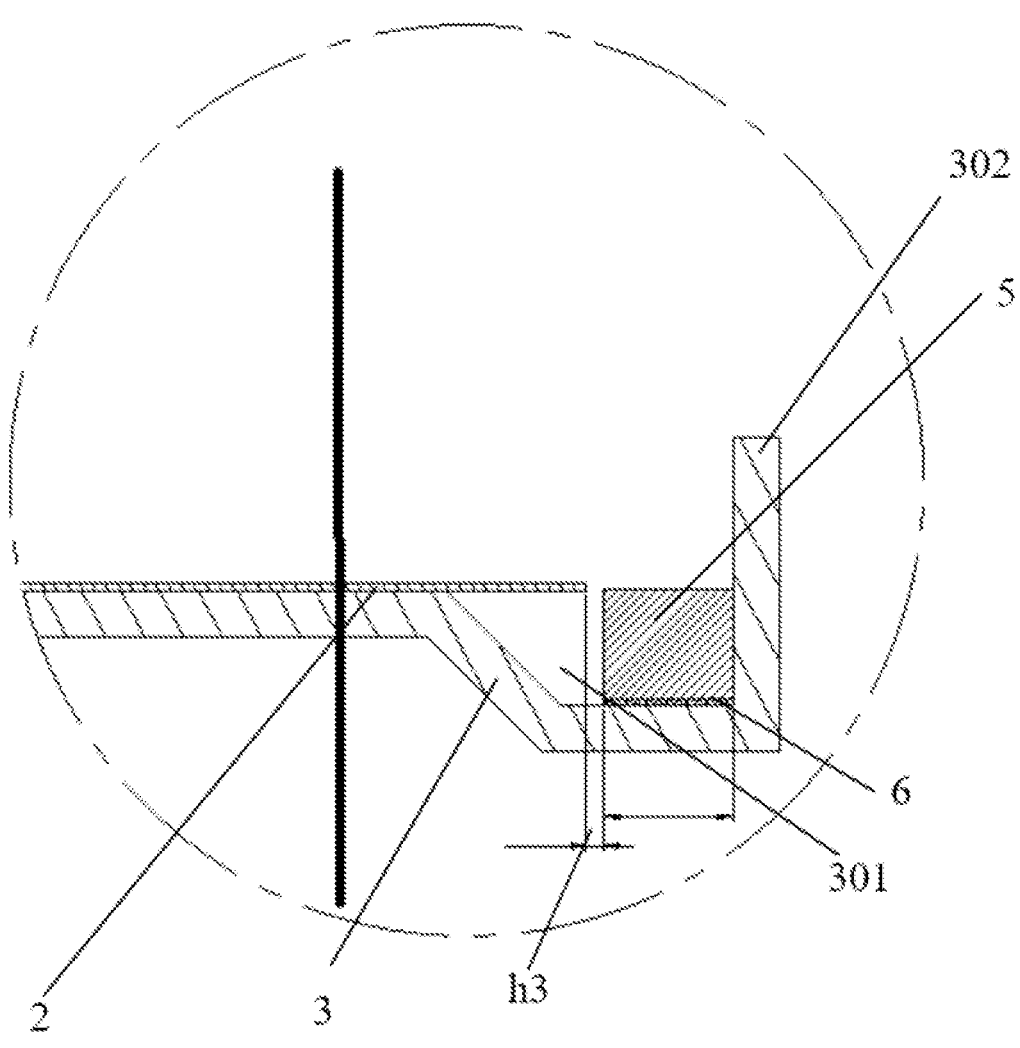
FIG. 7 shows a partially enlarged schematic diagram at B of FIG. 6 of a back plate and an elastic heat-conducting member according to an embodiment of the present disclosure.

In some embodiments, in order to reserve an expansion space for the reflection sheet 2, in the embodiments of the present disclosure, as shown in FIGS. 5, 6 and 7, the display module further includes an elastic heat-conducting member 5 and a fixing adhesive layer 6. The edge position of the back plate 3 close to the surface of the reflection sheet 2 is provided with a plurality of fixing grooves 301 and the notch of each fixing groove 301 faces towards the light guide plate 1. An elastic heat-conducting member 5 is fixed in each fixing groove 301 via a fixing adhesive layer 6. A gap is provided between a side of the elastic heat-conducting member 5 close to the reflection sheet 2 and the reflection sheet 2. The top of the elastic heat-conducting member 5 is in contact with the substrate 402 and the bottom of the elastic heat-conducting member 5 is in contact with the bottom of the fixing groove 301.

It should be noted that the elastic heat-conducting member 5 may be a rubber heat-conducting member, a metal heat-conducting member embedded with a spring or a polymer heat-conducting member having elasticity, etc. The shape of the elastic heat-conducting member 5 is determined according to the shape of the fixing groove 301 provided on the back plate 3 and the mounting position of the radiating piece. The embodiments of the present disclosure are not limited thereto. In addition, since each of the fixing grooves 301 is fixed with one elastic heat-conducting member 5 via the fixing adhesive layer 6, a gap is provided between a side of the elastic heat-conducting member 5 close to the reflection sheet 2 and the reflection sheet 2, sufficient space may be provided for the thermal expansion and contraction of the reflection sheet 2, thereby improving the display effect of the display module. In addition, since the top of the elastic heat-conducting member 5 is in contact with the substrate 402 and the bottom of the elastic heat-conducting member 5 is in contact with the bottom of the fixing groove 301, the elastic heat-conducting member 5 may transfer the heat generated by the substrate 402 to the back plate 3 via the elastic heat-conducting member 5 while providing a certain support for the substrate 402, thereby facilitating the heat dissipation of the display module.

Alternatively, the width of the gap between a side of the elastic heat-conducting member 5 close to the reflection sheet 2 and the reflection sheet 2 is greater than or equal to 0.35 mm. It should be noted that, as can be seen from the above-mentioned Table 3, when the module is applied in a high-temperature environment, the manufacturing tolerances are superimposed and the total expansion space required for the reflection sheet on a single side is 0.16 mm. However, in the embodiment of the present disclosure, the width of the gap between the side of the elastic heat-conducting member 5 close to the reflection sheet 2 and the reflection sheet 2 is set to be greater than or equal to 0.35 mm, such as 0.35 mm. 0.4 mm, etc., so that the gap between the reflection sheet 2 and the elastic heat-conducting member 5 is reserved to meet the thermal expansion and contraction requirements of the reflection sheet 2, avoiding bright lines at the edge of the picture caused by the reflection sheet 2 bulging up against the elastic heat-conducting member 5 at a high temperature, thereby ensuring the display effect of the display module. Here, a gap between the side of the elastic heat-conducting member 5 close to the reflection sheet 2 and the reflection sheet 2 are shown as h3 in FIGS. 4 and 10.

Optionally, the edge of the back plate 3 has a support arm 302. The support arm 302 extends in a direction away from the bottom of the fixing groove and protrudes from the notch of the fixing groove. A side of the elastic heat-conducting member 5 away from the reflection sheet 2 contacts the support arm 302.

It should be noted that the support arm 302 can be understood as a flanging structure in which the edge of the back plate 3 extends away from the bottom of the fixing groove, so that the back plate 3 forms an open-topped box structure. In this way, since the side of the elastic heat-conducting member 5 away from the reflection sheet 2 is in contact with the support arm 302, and the bottom of the elastic heat-conducting member 5 is in contact with the bottom of the fixing groove 301, the elastic heat-conducting member 5 may dissipate heat in two different directions of the bottom and the side of the back plate 3 at the same time, so that the heat dissipation efficiency of the elastic heat-conducting member 5 is improved, which is beneficial to reduce the use temperature of the light-emitting assembly 4 and ensure the service life of the light-emitting assembly 4. In addition, the support arm 302 and the frame included in the display module may be connected, so that the structure of the whole display module is more compact.

In some embodiments, in order to reserve an expansion space for the light guide plate 1, in embodiments of the present disclosure, a gap exists between an end of the substrate 402 away from the light guide plate 1 and the support arm 302.

It should be noted that the light-emitting assembly 4 includes a light-emitting member 401, a substrate 402 and an optical adhesive layer 403. The light-emitting member 401 is fixed on the substrate 402. The substrate 402 is adhered to the first surface of the light guide plate 1 via the optical adhesive layer 403. The light-emitting member 401 is located at the peripheral edge of the light guide plate 1. The light-emitting surface of the light-emitting member 401 is in contact with the edge of the light guide plate 1. Based on the above-mentioned, the light-emitting member 401 and the light guide plate 1 may form an integral body. The light-emitting member 401 may move together with the light guide plate 1 in the case of thermal expansion and contraction of the light guide plate 1. Thus, in the case where a gap exists between the end of the substrate 402 away from the light guide plate 1 and the support arm 302, there may also be a gap between the light guide plate 1 and the back plate 3 and a certain space may be provided for the thermal expansion and contraction of the light guide plate 1 via the gap.

Optionally, the width of the gap between the end of the substrate 402 away from the light guide plate 1 and the support arm 302 is greater than or equal to 0.5 mm and less than or equal to 1 mm. It should be noted that it can be seen from Table 2, that in the case where the width of the gap between the end of the substrate 402 away from the light guide plate 1 and the support arm 302 is greater than or equal to 0.5 mm and less than or equal to 1 mm, the light guide plate 1 satisfies the space required for expansion in a high-temperature environment. The high-temperature expansion of the light guide plate 1, the high-temperature expansion of the back plate 3 and the respective manufacturing tolerances of the both have been comprehensively considered for the gap, so that it can be ensured that the display module does not have the problems of insufficient effective incident light rate and insufficient picture uniformity due to insufficient space when the light guide plate 1 has thermal expansion and contraction. Here, the gap between the end of the substrate 402 away from the light guide plate 1 and the support arm 302 is shown as h6 in FIG. 10.

Alternatively, the groove wall on a side of the fixing groove 301 close to the reflection sheet 2 is an inclined surface. The included angle between a plane where the inclined surface is located and a plane where the groove bottom of the fixing groove 301 is located is an obtuse angle. It should be noted that the groove wall on the side of the fixing groove 301 close to the reflection sheet 2 is an inclined surface, and the included angle between the plane where the inclined surface is located and the plane where the groove bottom of the fixing groove 301 is located is an obtuse angle, so that the fixing groove 301 forms a groove forming a scoop-shaped structure. Furthermore, while an expansion space can be reserved for the light guide plate 1, sufficient installation space can also be provided for the overlapping of the light guide plate 1 and the substrate 402. It should be noted that, in the case where the groove wall on the side of the fixing groove 301 close to the reflection sheet 2 is an inclined surface, and the included angle between the plane where the inclined surface is located and the plane where the groove bottom of the fixing groove 301 is located is an obtuse angle, the included angle between the inclined surface formed after the edge of the reflection sheet 2 is pressed by the substrate 402 and the extending direction of the reflection sheet 2 is greater than or equal to 30°, so that the fixing groove 301 can also provide sufficient space for the reflection sheet 2 to be deformed by the pressing of the substrate 402.

In some embodiments, the amount of overlap between the substrate 402 and the reflection sheet 2 is greater than or equal to 0.85 millimeters. In this way, when the display module is applied in a high-temperature environment, after the substrate 402 expands and moves outwards with the light guide plate 1, there is still sufficient and effective overlap between the substrate 402 and the reflection sheet 2, so as to ensure that the reflection sheet 2 is always located on the lower surface of the substrate 402. There is no overlap between the high-temperature expanded substrate 402 and the reflection sheet 2, resulting in a bad phenomenon that when the substrate 402 contracts and moves back with the light guide plate 1 during recovering of a low temperature, the reflection sheet 2 is scooped up and the display effect of the display module is ensured. The overlapping amount of the substrate 402 and the reflection sheet 2 is shown as h4 in FIG. 10.

In addition, in order to increase the strength of the back plate 3 as a whole, in the embodiment of the present disclosure, a plurality of punching grooves 303 are provided on the surface of the back plate 3 close to the reflection sheet 2. The notch of each punching groove 303 faces towards the light guide plate 1 and a convex structure is formed on the surface of the back plate 3 away from the reflection sheet 2. It should be noted that the shapes of the plurality of punching grooves 303 may be the same or different. In the case where each of the punching grooves 303 is concave in a direction away from the reflection surface, and a convex structure is formed on the surface of the back plate 3 away from the reflection sheet 2, it may increase the overall strength of the back plate 3 by forming a structure of reinforcing ribs at the punching grooves 303 so as to prevent the back plate 3 from being damaged due to excessive force, thereby improving the service life of the back plate 3.

Furthermore, in some embodiments, a distance between a position where the first incident light reaches the reflection sheet 2 and an end of the optical adhesive layer 403 close to the reflection sheet 2 is greater than or equal to 0.5 mm. Here, the first incident light is a light with an angle of 45° between the incident light and a direction perpendicular to the plane of the reflection sheet 2. In this way, it may prevent the optical adhesive layer 403 from entering the visible region of the first incident light due to the bright edge of the display screen, thereby ensuring the display uniformity of the display module. It should also be noted that the light with an included angle of 45° between the incident light and the direction perpendicular to the plane in which the reflection sheet 2 is located is an inspection visual angle when the display module is shipped, i.e., it can be determined whether the picture of the display module meets the uniformity requirements by the first incident light. Here, the first incident light is shown as Z in FIG. 10. The distance between the position where the first incident light reaches the reflection sheet 2 and the end of the optical adhesive layer 403 close to the reflection sheet 2 is shown as h5 in FIG. 10.

Figure 10:
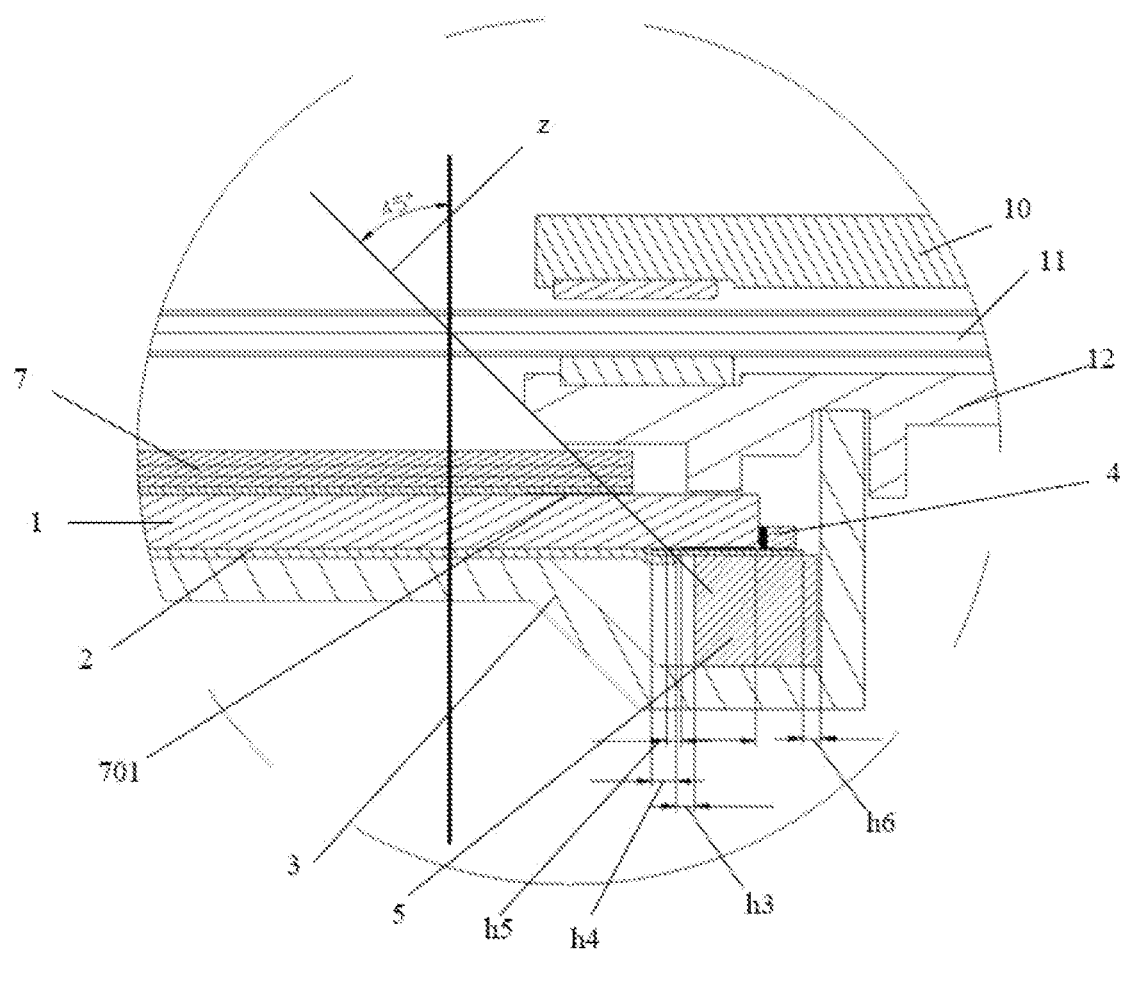
FIG. 10 shows a partially enlarged schematic diagram at C of FIG. 9 of a display module according to an embodiment of the present disclosure.

In other embodiments, as shown in FIG. 10, the display module further includes an optical membrane 7. The optical membrane 7 is attached on a second surface of the light guide plate 1. The second surface is an incident surface of the light guide plate 1. A black edge printing area 701 is arranged between the light guide plate 1 and the edge of the optical membrane 7. In this way, the bright lines at the edge of the picture caused by the optical adhesive layer 403 entering the visible region of the first incident light can also be masked by the black edge printing area 701, so as to ensure that the edge of the display picture of the display module is free from the bright lines caused by the optical adhesive layer 403, thereby improving the display uniformity of the display module.

To further enhance the display effect of the display module, the surface of the substrate 402 in contact with the reflection surface is coated with a reflective oil film. In this way, a certain amount of light may also be reflected to the light guide plate 1 through the surface of the substrate 402, thereby improving the incidence efficiency of the light.

In addition, the display effect of the display module may also be improved by limiting the size of the optical adhesive layer 403 and the substrate 402. Specifically, in a possible implementation, as shown in FIG. 4, the distance between an end of the optical adhesive layer 403 away from the light-emitting member 401 and the light-emitting surface of the light-emitting member 401 is greater than or equal to 2 mm. In this way, it may ensure that the edge of the display picture of the display module is free from the bright lines caused by the optical adhesive layer 403, thereby improving the display uniformity of the display module. The distance between the end of the optical adhesive layer 403 away from the light-emitting member 401 and the light-emitting surface of the light-emitting member 401 is shown as h2 in FIG. 4.

In a possible implementation, as shown in FIG. 4, the distance between an end of the substrate 402 away from the light-emitting member 401 and an end of the optical adhesive layer 403 away from the light-emitting member 401 is greater than or equal to 1.2 mm. In this way, it may ensure that the substrate 402 and the reflection sheet 2 effectively overlap in different environmental application scenarios of the display module, so as to avoid the dark edge of the picture caused by the insufficient amount of overlap between both during the shrinking from the reflection sheet 2 at a low temperature and to ensure the display effect of the display module. The distance between the end of the substrate 402 away from the light-emitting member 401 and the end of the optical adhesive layer 403 away from the light-emitting member 401 is shown as h1 in FIG. 4.

Figure 1:
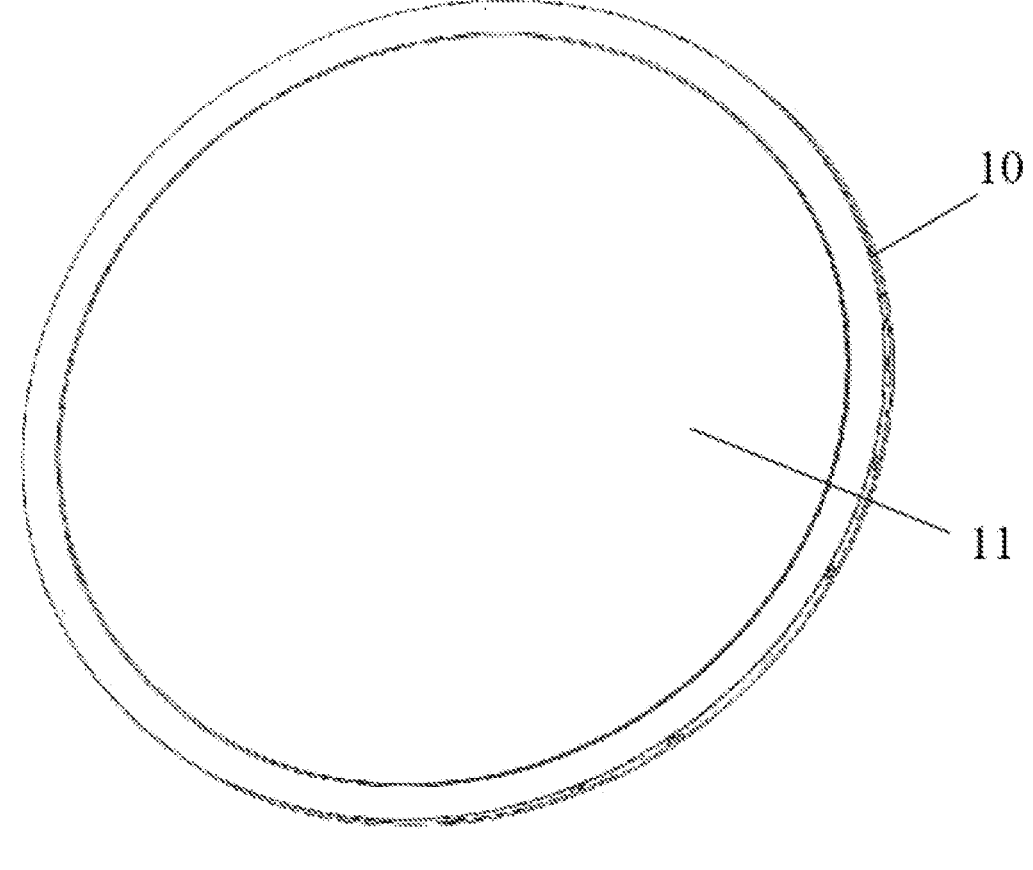
FIG. 1 shows a schematic structural diagram of a display module according to an embodiment of the present disclosure.
Figures 2, 3:
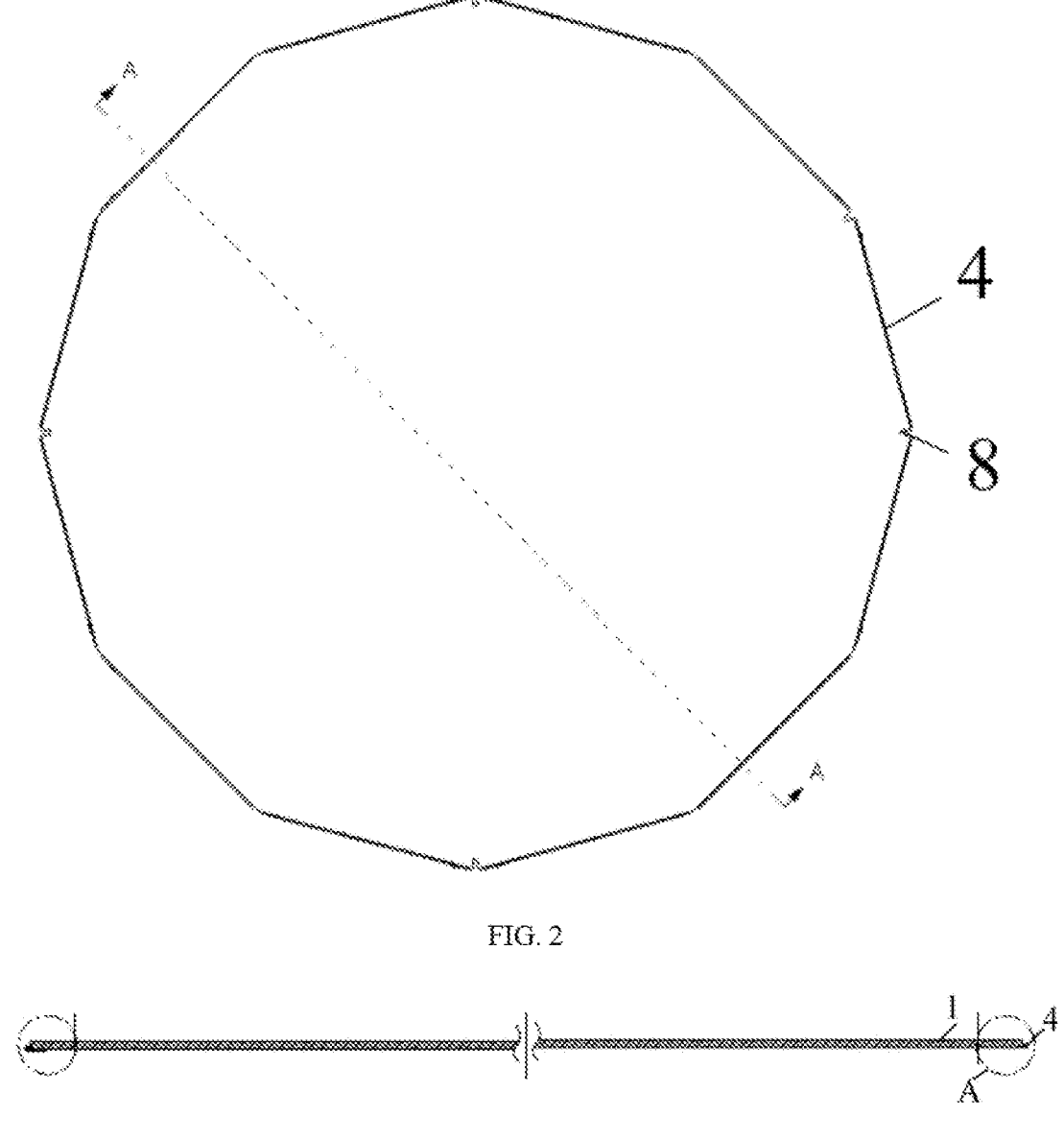
FIG. 2 shows a schematic structural diagram of a light-emitting assembly included in a display module according to an embodiment of the present disclosure.
FIG. 3 shows a schematic cross-sectional diagram along a direction A-A in FIG. 2 of a light-emitting assembly included in a display module according to an embodiment of the present disclosure.

Alternatively, as shown in FIG. 2, a first limiting structure 8 is arranged between two adjacent light-emitting assemblies 4. In this way, by means of the first limiting structure 8, it can be ensured that the light-emitting member 401 can always be located at the peripheral edge of the light guide plate 1. The light-emitting surface of the light-emitting member 401 is in contact with the edge of the light guide plate 1. Based on the above-mentioned, the light-emitting member 401 and the light guide plate 1 may form an integral body. The light-emitting member 401 may move together with the light guide plate 1 in the case of thermal expansion and contraction of the light guide plate 1. In addition, there is no gap between the light-emitting surface of the light-emitting member 401 and the light guide plate 1. Therefore, the light of the light-emitting member 401 can all be absorbed by the light guide plate 1.

Alternatively, as shown in FIG. 5, a second limiting structure 9 is arranged between two adjacent elastic heat-conducting members 5. In this way, the position of the elastic heat-conducting member 5 may be kept constant by the second limiting structure 9. i.e., the top of the elastic heat-conducting member 5 is always in contact with the substrate 402 and the bottom of the elastic heat-conducting member 5 is in contact with the bottom of the fixing groove 301, thereby ensuring the heat dissipation effect of the elastic heat-conducting member 5.

Figures 8, 9:
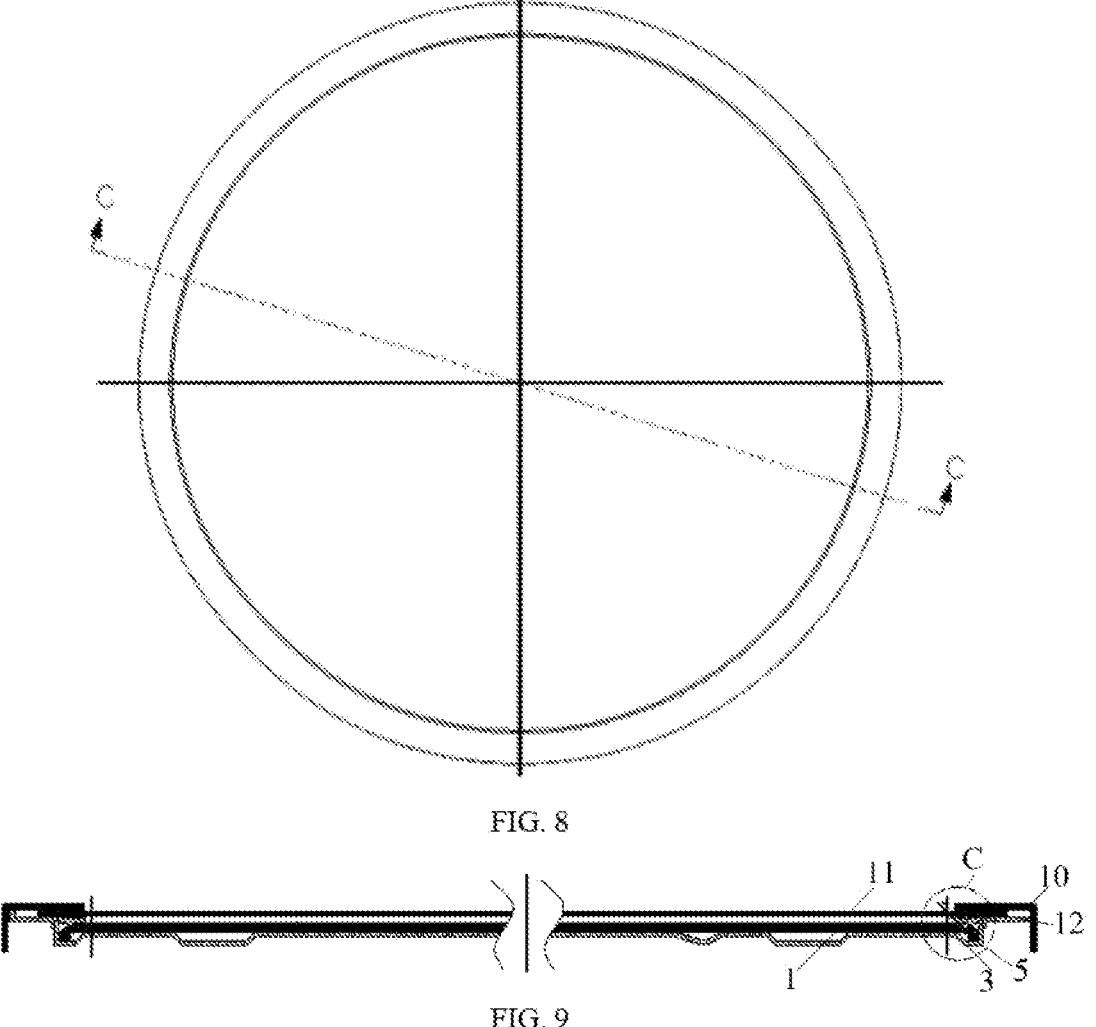
FIG. 8 shows a schematic diagram of an overall structure of a display module according to an embodiment of the present disclosure.
FIG. 9 shows a schematic cross-sectional diagram in a direction C-C of FIG. 8 of a display module according to an embodiment of the present disclosure.

In addition, in the embodiment of the present disclosure, as shown in FIGS. 8, 9 and 10, the display module further includes a first frame 10, a display screen 11, a second frame 12 and a circuit board 13. The display screen 11 is fixed between the first frame 10 and the second frame 12. The second frame 12 is connected between the optical membrane 7 and the first frame 10. The edge of the back plate 3 is clamped on the second frame 12. The circuit board 13 is fixed on the surface of the back plate 3 away from the light guide plate 1. In this way, when the integral assembly of the display module is completed, the display screen 11 is fixed between the first frame 10 and the second frame 12, the second frame 12 is connected between the optical membrane 7 and the first frame 10, and the edge of the back plate 3 is clamped on the second frame 12, so that the structure of the whole display module is more compact and firm, which is beneficial to reducing the overall volume of the display module and facilitating a lightweight design of the display module.

It can be seen from the above-mentioned embodiments that in the embodiments of the present disclosure, since the plurality of light-emitting assemblies 4 are arranged at the circumferential edge of the light guide plate 1, the light-emitting assemblies 4 are arranged all around the light guide plate 1, so that the display module may allow the incident light in an annular shape and thus the display module is not limited by the shape of the display surface, so as to ensure the consistency of the display effect. Furthermore, the light-emitting assembly 4 includes a light-emitting member 401, a substrate 402 and an optical adhesive layer 403. The light-emitting member 401 is fixed on the substrate 402. The substrate 402 is adhered to the first surface of the light guide plate 1 via the optical adhesive layer 403. The light-emitting member 401 is located at the peripheral edge of the light guide plate 1. The light-emitting surface of the light-emitting member 401 is in contact with the edge of the light guide plate 1. Based on the above-mentioned, the light-emitting member 401 and the light guide plate 1 may form an integral body. The light-emitting member 401 may move together with the light guide plate 1 in the case of thermal expansion and contraction of the light guide plate 1. In addition, there is no gap between the light-emitting surface of the light-emitting member 401 and the light guide plate 1. Therefore, the light of the light-emitting member 401 can all be absorbed by the light guide plate 1, thereby ensuring the effectiveness and uniformity of the brightness of the display module and ensuring the display effect of the display module.

In addition, the width of the gap between the side of the elastic heat-conducting member 5 close to the reflection sheet 2 and the reflection sheet 2 is set to be greater than or equal to 0.35 mm, etc., so that the gap between the reflection sheet 2 and the elastic heat-conducting member 5 is reserved to meet the thermal expansion and contraction requirements of the reflection sheet 2, avoiding bright lines at the edge of the picture caused by the reflection sheet 2 bulging up against the elastic heat-conducting member 5 at a high temperature, thereby ensuring the display effect of the display module. Also, when the width of the gap between the end of the substrate 402 away from the light guide plate 1 and the support arm 302 is greater than or equal to 0.5 mm, the light guide plate 1 satisfies the space required for expansion in a high-temperature environment. The high-temperature expansion of the light guide plate 1, the high-temperature expansion of the back plate 3 and the respective manufacturing tolerances of the both have been comprehensively considered for the gap, so that it can be ensured that the display module does not have the problems of insufficient effective incident light rate and insufficient picture uniformity due to insufficient space when the light guide plate 1 has thermal expansion and contraction.

It should be noted that each embodiment in this specification is described in a progressive manner. Each embodiment focuses on the differences from other embodiments. The same and similar parts between each embodiment can be referred to each other.

Although the optional embodiments of the embodiments of the present disclosure have been described, those skilled in the art can make additional changes and modifications to these embodiments once they know the basic creative concepts. Therefore, the appended claims are intended to be interpreted as including optional embodiments and all changes and modifications falling within the scope of the embodiments of the present disclosure.

Finally, it should also be noted that in the specification, relational terms such as the first and second are only used to distinguish one entity from another entity and do not necessarily require or imply any such actual relationship or order between these entities. Moreover, the terms "including", "comprising" or any other variation thereof are intended to cover non-exclusive inclusion, so that an article or terminal device that includes a series of elements not only includes those elements, but also includes other elements not explicitly listed, or also includes elements inherent in such article or terminal device. In the absence of further restrictions, the elements defined by the statement "including a . . . " do not exclude the existence of other identical elements in the items or terminal equipment that include the elements.

The technical solutions provided by the present disclosure have been described in detail, and the principles and embodiments of the present disclosure have been described herein using specific examples. Meanwhile, those of ordinary skill in the art will appreciate that they may make modifications in the specific embodiments and applications of the present disclosure based on the principles and implementations of the present disclosure. In summary, the contents of this description should not be construed to limit the present disclosure.

The invention claimed is:

1. A display module comprising a light guide plate, a reflection sheet, a back plate and a plurality of light-emitting assemblies, wherein:

the reflection sheet is arranged between the back plate and the light guide plate, and the plurality of light-emitting assemblies are arranged at a circumferential edge of the light guide plate;

each of the plurality of light-emitting assemblies comprises a light-emitting member, a substrate and an optical adhesive layer, the light-emitting member is fixed on the substrate, the substrate is bonded to a first surface of the light guide plate via the optical adhesive layer, and a light-emitting surface of the light-emitting member is in contact with the circumferential edge of the light guide plate, wherein the first surface is opposite to a surface of the light guide plate for emitting light, such that the light-emitting member and the light guide plate form an integral body and the light-emitting member is capable of moving together with the light guide plate for thermal expansion and contraction of the light guide plate; and an end of the substrate is overlapped on a surface of an edge of the reflection sheet adjacent to the light guide plate.

2. The display module according to claim 1, wherein the display module further comprises a plurality of elastic heat-conducting members and a plurality of fixing adhesive layers;

a plurality of fixing grooves are provided at an edge position of a surface of the back plate adjacent to the reflection sheet, and a notch of each of the plurality of fixing grooves faces towards the light guide plate; and each of the fixing grooves is fixed with one of the plurality of elastic heat-conducting members via one of plurality of the fixing adhesive layers, a gap is provided between a side of the elastic heat-conducting member adjacent to the reflection sheet and the reflection sheet, a top of the elastic heat-conducting member is in contact with the substrate, and a bottom of the elastic heat-conducting member is in contact with a bottom of the fixing groove.

3. The display module according to claim 2, wherein a width of the gap between the side of the elastic heat-conductive member adjacent to the reflection sheet and the reflection sheet is greater than or equal to 0.35 mm.

4. The display module according to claim 2, wherein an edge of the back plate is provided with a support arm; and the support arm is extended in a direction away from the bottom of the fixing groove and is protruded from the notch of the fixing groove, and a side of the elastic heat-conducting member away from the reflection sheet is in contact with the support arm.

5. The display module according to claim 4, wherein a gap is provided between an end of the substrate away from the light guide plate and the support arm.

6. The display module according to claim 5, wherein a width of the gap between the end of the substrate away from the light guide plate and the support arm is greater than or equal to 0.5 mm, and less than or equal to 1 mm.

7. The display module according to claim 2, wherein a groove wall on a side of the fixing groove adjacent to the reflection sheet is an inclined surface, and an included angle between a plane where the inclined surface is located and a plane where the bottom of the fixing groove is located is an obtuse angle.

8. The display module according to claim 2, wherein a second limiting structure is arranged between two adjacent elastic heat-conducting members of the plurality of elastic heat-conducting members.

9. The display module according to claim 1, wherein the substrate and the reflection sheet are overlapped by an amount greater than or equal to 0.85 mm.

10. The display module according to claim 1, wherein a surface of the back plate adjacent to the reflection sheet is provided with a plurality of punching grooves, a notch of each of the plurality of punching grooves faces towards the light guide plate, and a convex structure is formed on a surface of the back plate away from the reflection sheet.

11. The display module according to claim 1, wherein a distance between a position where a first incident light reaches the reflection sheet and an end of the optical adhesive layer adjacent to the reflection sheet is greater than or equal to 0.5 mm, wherein the first incident light is an incident light having an included angle of 45° with a direction perpendicular to a plane in which the reflection sheet is located.

12. The display module according to claim 1, wherein the display module further comprises an optical membrane;

the optical membrane is attached on a second surface of the light guide plate, wherein the second surface is an incident surface of the light guide plate; and a black edge printing area is arranged between the light guide plate and an edge of the optical membrane.

13. The display module according to claim 12, wherein the display module further comprises a first frame, a display screen, a second frame and a circuit board;

the display screen is fixed between the first frame and the second frame, the second frame is connected between the optical membrane and the first frame, and an edge of the back plate is clamped on the second frame; and the circuit board is fixed on a surface of the back plate away from the light guide plate.

14. The display module according to claim 1, wherein a surface of the substrate in contact with a reflection surface of the reflection sheet is coated with a reflective oil film.

15. The display module according to claim 1, wherein a distance between an end of the optical adhesive layer away from the light-emitting member and the light-emitting surface of the light-emitting member is greater than or equal to 2 mm.

16. The display module according to claim 1, wherein a distance between an end of the substrate away from the light-emitting member and an end of the optical adhesive layer away from the light-emitting member is greater than or equal to 1.2 mm.

17. The display module according to claim 1, wherein a first limiting structure is arranged between two adjacent light-emitting assemblies of the plurality of light-emitting assemblies.

* * * * *